(12) United States Patent
Robinson et al.

(10) Patent No.: US 12,344,184 B1
(45) Date of Patent: Jul. 1, 2025

(54) SYSTEMS AND METHODS FOR ACTUATING A VEHICLE HOOD

(71) Applicant: Rivian IP Holdings, LLC, Irvine, CA (US)

(72) Inventors: William Kirk Robinson, Newport Beach, CA (US); Marcus Edward Merideth, Irvine, CA (US); Brendan White, Irvine, CA (US); Suhant Ranga, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/829,859

(22) Filed: Sep. 10, 2024

(51) Int. Cl.
*B60R 21/38* (2011.01)
*E05B 77/08* (2014.01)
*E05B 83/24* (2014.01)

(52) U.S. Cl.
CPC .............. *B60R 21/38* (2013.01); *E05B 77/08* (2013.01); *E05B 83/243* (2013.01)

(58) Field of Classification Search
CPC .............. B60R 2021/343; B60R 21/34; B60R 2019/007; B60R 21/0134; B60R 21/0136; B60R 21/38; E05B 83/243; E05B 77/08
USPC .................................. 180/274, 69.2
See application file for complete search history.

(56) References Cited

U.S. PATENT DOCUMENTS

| | | | | |
|---|---|---|---|---|
| 6,390,878 B1 * | 5/2002 | Zhou | ...................... | A63H 17/26 446/14 |
| 7,392,876 B2 * | 7/2008 | Browne | .................. | B60R 21/38 296/193.11 |
| 8,056,961 B2 * | 11/2011 | Aase | ...................... | B60R 21/34 296/187.04 |
| 8,534,410 B2 * | 9/2013 | Nakaura | ................. | E05B 77/08 180/274 |
| 8,579,068 B2 * | 11/2013 | Farooq | .................... | E05B 77/08 180/274 |
| 8,656,716 B2 * | 2/2014 | Schafer | ................... | B60R 21/38 60/407 |
| 10,975,599 B2 * | 4/2021 | Sasaki | .................. | B62D 25/105 |
| 2014/0345963 A1 * | 11/2014 | Ferri | ....................... | E05B 77/08 180/274 |

FOREIGN PATENT DOCUMENTS

| | | | | |
|---|---|---|---|---|
| CN | 218594294 U | * | 3/2023 | |
| DE | 102005021725 A1 | * | 11/2006 | ............. B60R 19/40 |
| JP | 7481172 B2 | * | 5/2024 | |

OTHER PUBLICATIONS

English Translation of Shen CN218594294U (Year: 2023).*

* cited by examiner

*Primary Examiner* — Paul N Dickson
*Assistant Examiner* — Caitlin Anne Miller
(74) *Attorney, Agent, or Firm* — BAKERHOSTETLER

(57) ABSTRACT

An apparatus may be used to release a hood of a vehicle. In one or more implementations, the vehicle detects a pedestrian and the apparatus releases the hood. The apparatus may include a biasing component that, when released, provides a force to another component to release the hood. In order to release the biasing component, the apparatus may include shape memory alloy that deforms when heated. As an exemplary heating method, the vehicle may include a sensor that detects the pedestrian and provides a signal in the form of electrical current that passes through the shape memory allow. The hood may release prior to the pedestrian contacting the hood.

20 Claims, 15 Drawing Sheets

SYSTEMS AND METHODS FOR ACTUATING A VEHICLE HOOD

INTRODUCTION

Vehicles commonly include a hood (e.g., front hood). The hood can be opened to uncover a motor or additional storage space. The hood can be subsequently closed to cover the motor or the storage space.

SUMMARY

The subject technology is directed to releasing the hood of a vehicle in response to an impact event to the vehicle by an object (e.g., pedestrian). As an example, an apparatus (e.g., release mechanism) may be used to open the hood in the event the vehicle detects and/or contact the object. Moreover, the apparatus is designed to release the hood prior to the object contacting the hood. Beneficially, in the event of pedestrian contact with the vehicle, based on the apparatus releasing the hood prior to the pedestrian contacting the hood, the apparatus may cause the hood to function as a damper that absorbs energy due to impact from the pedestrian, thus minimizing the likelihood of injury.

The subject technology is directed to releasing the hood of a vehicle in response to an impact event to the vehicle by an object (e.g., pedestrian). As an example, an apparatus (e.g., release mechanism) may be used to open the hood in the event the vehicle detects and/or contact the object. Moreover, the apparatus is designed to release the hood prior to the object contacting the hood. Beneficially, in the event of pedestrian contact with the vehicle, based on the apparatus releasing the hood prior to the pedestrian contacting the hood, the apparatus may cause the hood to function as a damper that absorbs energy due to impact from the pedestrian, thus minimizing the likelihood of injury.

In one or more aspects of the present disclosure, an apparatus for a vehicle is described. The apparatus may include a biasing component. The apparatus may further include a retaining arm configured to retain the biasing component in a first position. The apparatus may further include a trigger. In one or more implementations, a displacement of the trigger causes a displacement of the retaining arm, and the displacement of the retaining arm causes the biasing component to move from the first position to a second position to displace a hood of the vehicle. In the first position, the biasing component may be in a compressed state. In the second position, the biasing component may be in a decompressed state. The biasing component may include a spring, and the trigger may include shape memory alloy. In response to the shape memory alloy receiving electrical current, the shape memory alloy may deform. The shape memory may be configured to receive the electrical current from a sensor in a vehicle, and in response to the sensor ceasing providing the electrical current, the biasing component is configured to return to the compressed state. The trigger may be configured to return to a prior state subsequent to the displacement of the trigger.

The apparatus may further include a hook configured to release the biasing component based on the displacement of the trigger. The apparatus may further include a housing configured to receive the biasing component. The apparatus may further include a motion stop positioned in the housing. In one or more implementations, the displacement of the biasing component is based on the motion stop.

In one or more aspects of the present disclosure, a vehicle is described. The vehicle may include an apparatus. The apparatus may include one or more retaining arms. The apparatus may further include a spring configured to be compressed by the one or more retaining arms to place the spring in a first state. In one or more implementations, the spring is configured to, in response to an input from a sensor, cause a hood to open in the first state. The spring may further be configured to be released by the one or more retaining arms to place the spring in a second state different from the first state. The vehicle may further include a striker coupled with the hood. The vehicle may further include a latch mechanism configured to hold the striker. The hood may be configured to move relative to the latch mechanism. Also, the hood may be configured to move relative to the striker. The apparatus may further include a trigger coupled to the spring. The trigger may be configured to receive electrical current from the sensor based on the input. The trigger may include shape memory alloy configured to deform based on the electrical current. The shape memory alloy may be configured to actuate the one or more retaining arms based on the shape memory alloy deforming.

The apparatus may further include a housing configured to receive the spring. The apparatus may further include a motion stop positioned in the housing. Movement of the spring may be based on the motion stop. The one or more retaining arms may include a cylindrical element configured to engage the motion stop. The spring may surround the one or more retaining arms. The sensor may be carried by a bumper In one or more aspects of the present disclosure, a method is described. The method may include receiving, by a trigger, an electrical current configured to cause a first displacement of the trigger. The method may further include actuating, based on the displacement of the trigger, one or more retaining arms. The method may further include releasing, based on actuating one or more retaining arms, a biasing component. The method may further include actuating, based on releasing the biasing component, a housing configured to contact the hood. The trigger may be configured to deform, based on the sensor, to place the biasing component in a second position and displace a hood of a vehicle. The method may further include deforming, based on the electrical current, the trigger.

In one or more implementations, deforming trigger includes causing, based on a signal from the sensor, a temperature change in a wire; and further includes deforming, based on the temperature change, the wire. Also, in one or more implementations, actuating the one or more retaining arms causes the one or retaining arms to move toward a longitudinal axis.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to an apparatus (e.g., release mechanism) for releasing the hood of a vehicle due to certain impact events to the vehicle. In one or more implementations, the vehicle includes a sensor designed to detect a pedestrian and provide an input that causes the apparatus to deploy, or expand, and open the hood. The signal generated by the sensor may be provided to shape memory alloy (SMA) that functions as a trigger and reacts to electrical current from the signal by heating up (e.g., through conversion of electrical energy to thermal energy) and displacing or otherwise deforming. As a non-limiting example, SMA may include nickel titanium or nitinol. The displaced SMA may function as the triggering event to release a biasing component (e.g., spring) of the apparatus, and the released biasing component causes the hood to open. The apparatus is designed to react quickly to the sensor input and provide a force strong enough to release the hood. For example, the apparatus may release the hood in 50 milliseconds (ms) or less, and in some instances, in 25 ms or less. In this regard, the apparatus may release the hood prior the pedestrian making contact with the hood. Beneficially, the apparatus causes the hood to function as a damper that can "break the fall" of the pedestrian, including the pedestrian's head, rather than the pedestrian's head contacting the hood while the hood is in a closed position. Additionally, the apparatus may include additional damping (e.g., one or more additional springs) to further absorb energy from pedestrian impact.

Figure 1:
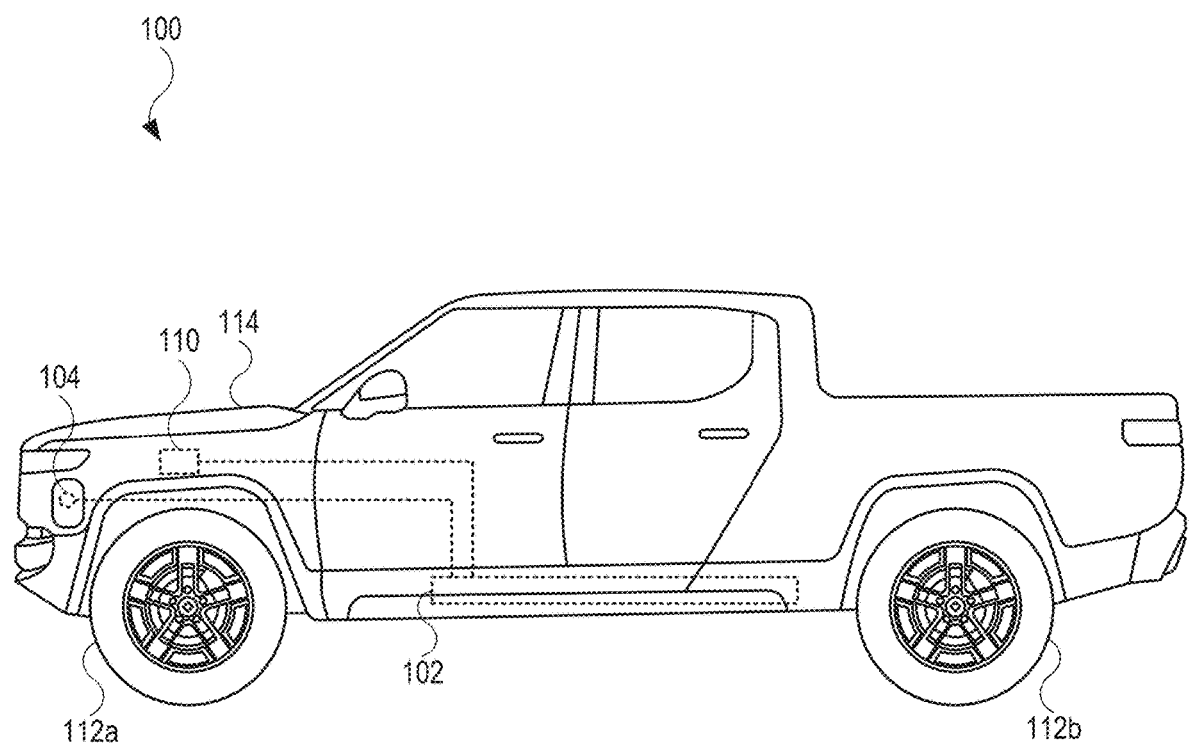
FIG. 1 illustrates a side view of an example of a vehicle, in accordance with aspects of the present disclosure.

FIG. 1 illustrates a side view of an example of a vehicle 100, in accordance with aspects of the present disclosure. In one or more implementations, the vehicle 100 is a sport utility vehicle (SUV). In the example shown in FIG. 1, the vehicle 100 is a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple to a drive unit 110, representative of one or more drive units of the vehicle 100. While the drive unit 110 is shown as generally being in the front of the vehicle 100, the drive unit 110 may be located in the rear of the vehicle 100. Further, when multiple drive units are used, at least one drive unit may be in the front of the vehicle to drive the front wheels (e.g., wheel 112a), and at least one drive unit may be in the rear of the vehicle to drive the rear wheels (e.g. wheel 112b). The drive unit 110 may include, for example, a motor, an inverter, a gear box, and a differential. In the example shown in FIG. 1, the drive unit 110 takes the form of an electric motor. In this regard, the drive unit 110a may use energy (e.g., electrical energy) stored in the battery pack 102 for propulsion in order to rotationally drive the wheels 112a and 112b, representative of additional wheels, of the vehicle 100.

Additionally, the vehicle 100 may include a hood 114. In one or more implementations, the hood 114 provides a cover for the drive unit 110. Alternatively, in one or more implementations, the hood 114 provides a cover for a space or volume (not shown in FIG. 1) that provides a location for a user to store one or more items.

Figure 2:
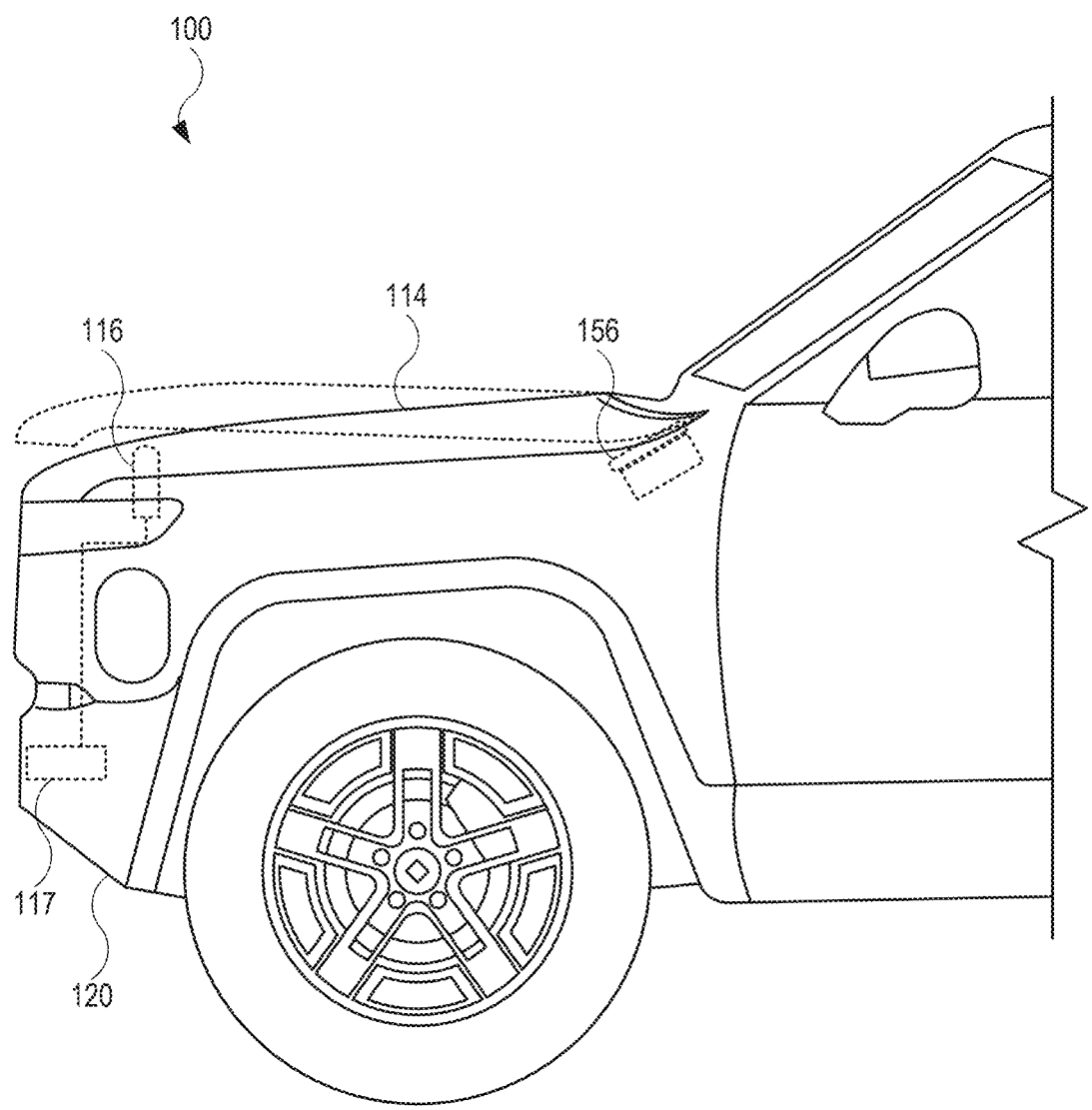
FIG. 2 illustrates an enlarged side view of a vehicle, showing an apparatus located in the vehicle, in accordance with aspects of the present disclosure.

FIG. 2 illustrates an enlarged side view of a vehicle 100, showing an apparatus 116 located in the vehicle 100, in accordance with aspects of the present disclosure. The apparatus 116 may be used to release the hood 114. In this regard, the vehicle 100 may further include a sensor 117 designed to detect an object and provide an output (e.g., electrical signal) to the apparatus 116, causing the apparatus 116 to release the hood 114. The dotted lines show the hood 114 in an open position. As non-limiting examples, the sensor 117 may include a proximity sensor (e.g., capacitive sensor, photoelectric sensor, ultrasonic sensor), an image sensor (e.g., camera), or a combination thereof. As shown in FIG. 2, the sensor 117 is located in a bumper 120 of the vehicle 100. However, other locations are possible. Additionally, while the apparatus 116 is positioned at or near a front portion of the hood 114, other positions are possible.

As an exemplary application, when an object comes into contact with the bumper 120, the momentum of the object and/or the contact with the bumper 120 may cause the object to contact the hood 114. However, when the sensor 117 detects the object, the sensor 117 may generate and transmit a signal to the apparatus 116, which causes actuation of one or more components (not shown in FIG. 2) of the apparatus 116 to open the hood 114. Moreover, the apparatus 116 is designed to react to the signal from the sensor 117 by causing the hood 114 to open prior to the object making contact with the hood 114. As a result, the hood 114, in the open position, may absorb impact from the object. When the object is a pedestrian, the hood 114, in the open position, may reduce or prevent injury as compared to a pedestrian contacting the hood 114 while the hood 114 is in a closed position. Additionally, the vehicle 100 may include a hinge 156, representative of one or more hinges. As a non-limiting example, the hinge 156 may include a 4-bar hinge. When an object contacts the hood 114 in the open position, the hinge 156 may provide dampening.

Figure 3A:
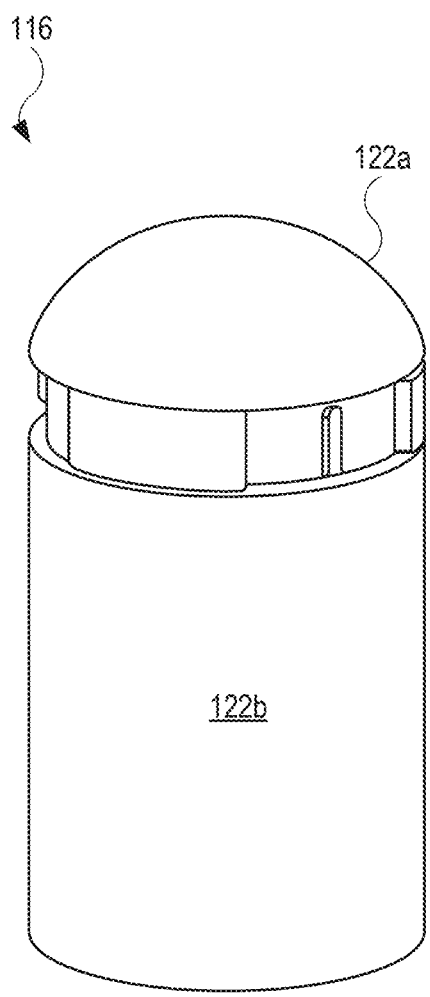
FIG. 3A and FIG. 3B illustrate perspective views of an apparatus, in accordance with aspects of the present disclosure.
Figure 3B:
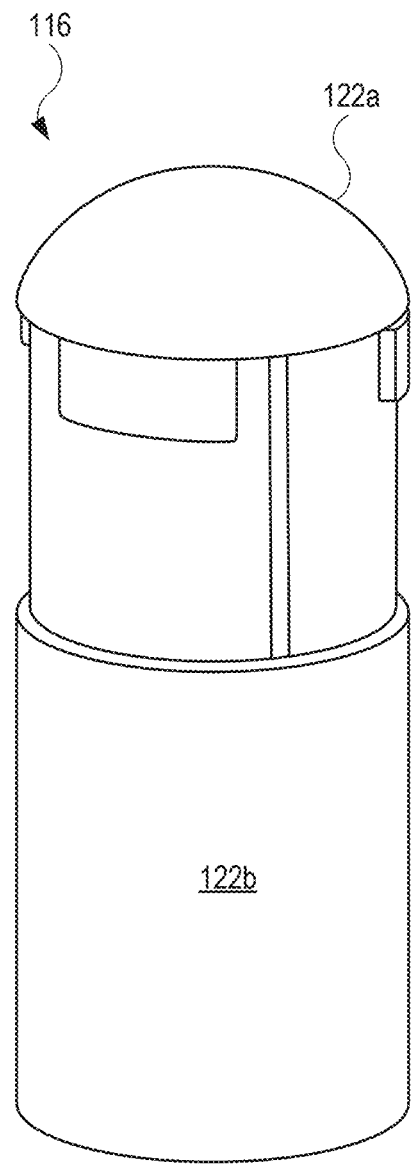

FIG. 3A and FIG. 3B illustrate perspective views of the apparatus 116, in accordance with aspects of the present disclosure. Referring to FIG. 3A, the apparatus 116 may include a housing 122a and a housing 122b. As shown, the housing 122a is dome shaped and the housing 122b is cylindrical. However, other shapes are possible. Further, FIG. 3A shows the apparatus 116 in a stowed position or a closed position, representing a position of the apparatus 116 prior to opening a hood (not shown in FIG. 3A).

Referring to FIG. 3B, the apparatus 116 is in a deployed position or open position, representing a position of the apparatus 116 that causes a hood (not shown in FIG. 3B) to open. As shown in FIG. 3B, the housing 122a is displaced (e.g., moved away) from the housing 122b in the deployed position.

Figure 4:
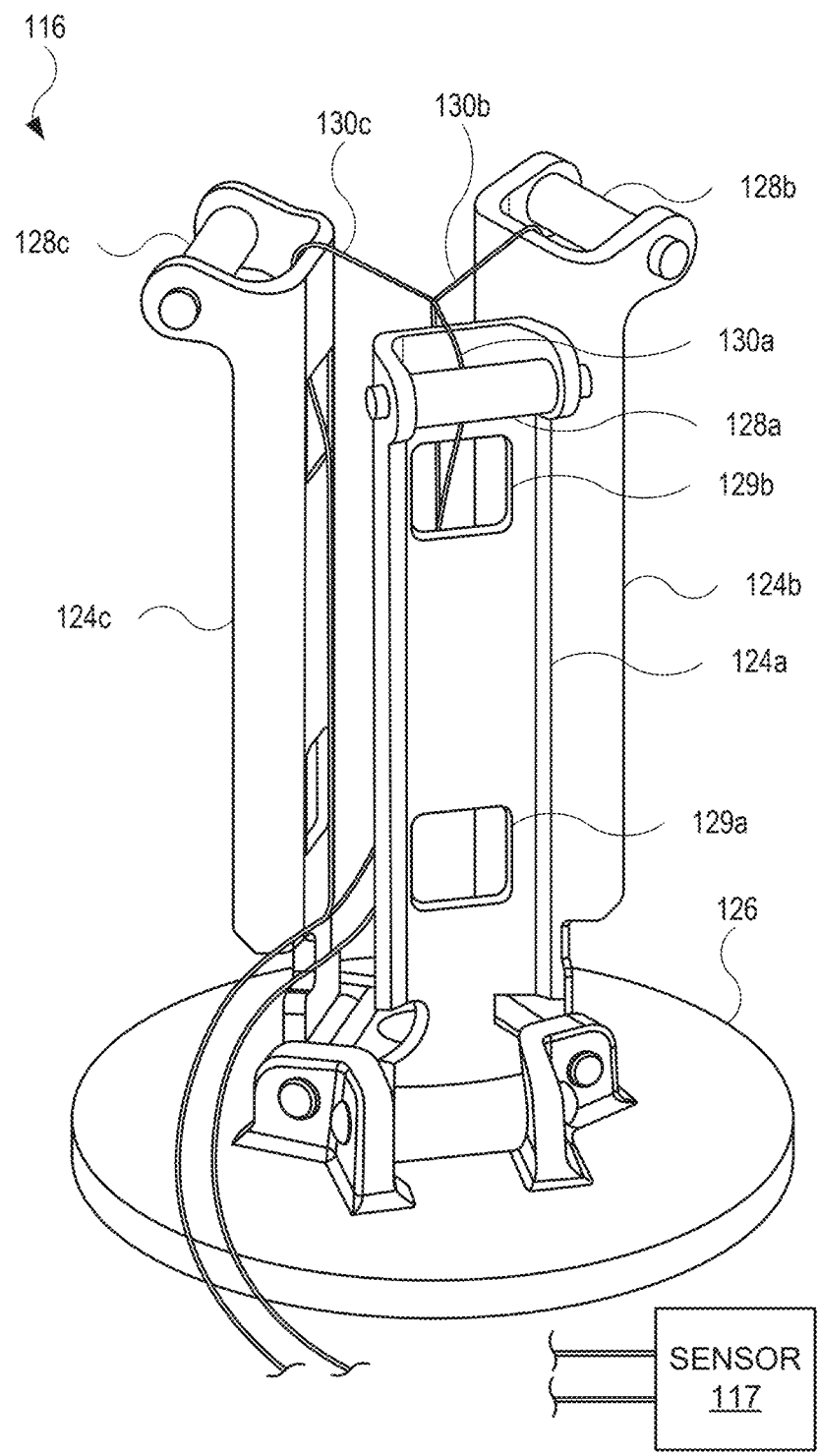
FIG. 4 and FIG. 5 illustrate perspective views of components of an apparatus, in accordance with aspects of the present disclosure.
Figure 5:
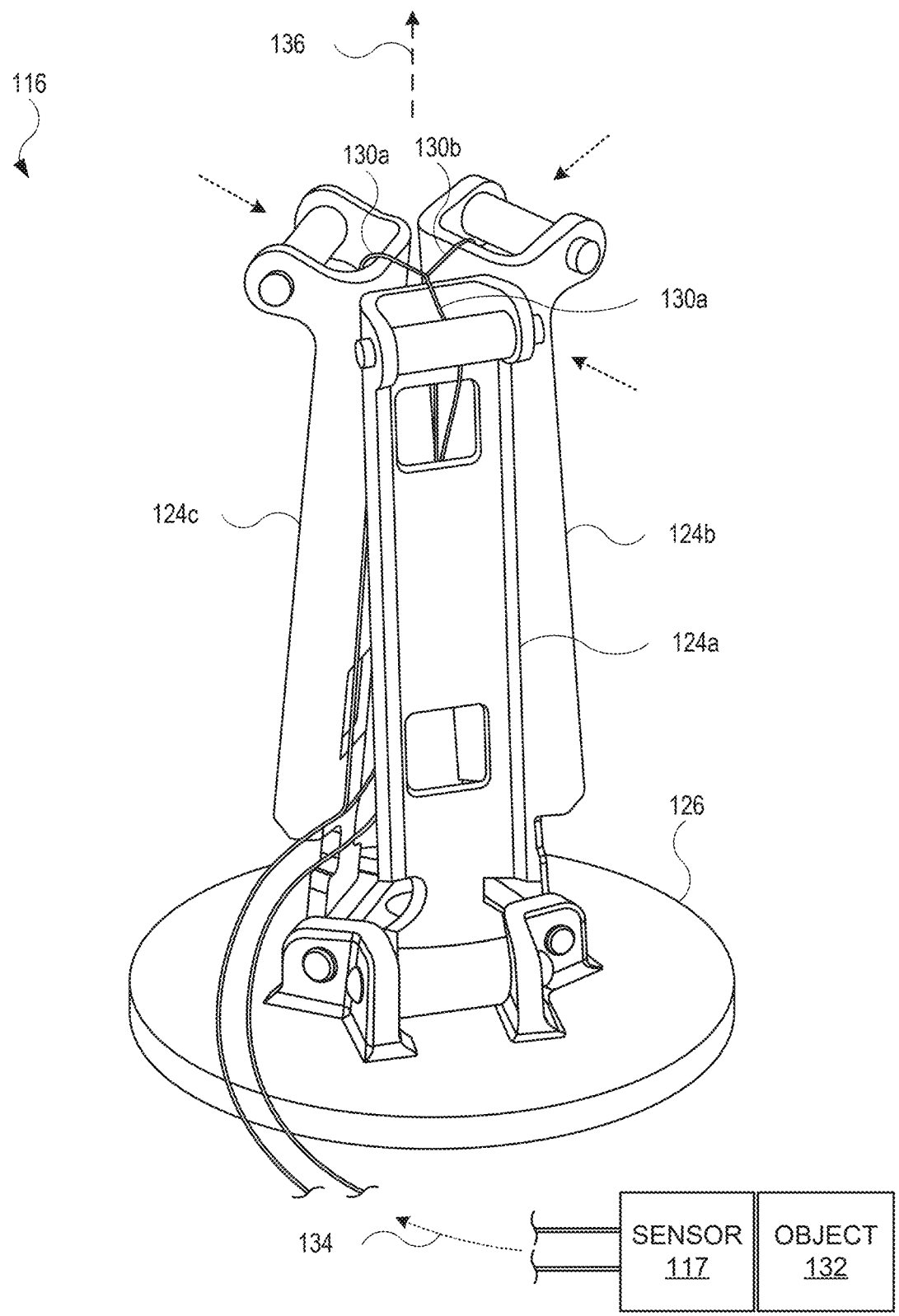

FIG. 4 and FIG. 5 illustrate perspective views of components of the apparatus 116, in accordance with aspects of the present disclosure. For purposes of illustration, the housings 122a and 122b (shown in FIG. 3A and FIG. 3B) are removed. Referring to FIG. 4, the apparatus 116 includes several arms. For example, the apparatus 116 includes an arm 124a, an arm 124b, and an arm 124c. As shown, each of the arms 124a, 124b, and 124c is coupled (e.g., rotationally coupled or pivotably coupled) to a base 126. In one or more implementations, the arms 124a, 124b, and 124c are designed to retain a structure (not shown), which may include a biasing component (e.g., spring) as a non-limiting example. The arm 124a, the arm 124b, and the arm 124c may include a cylindrical element 128a, a cylindrical element 128b, a cylindrical element 128c, respectively. In one or more implementations, when the arms 124a, 124b, 124c release a structure, the cylindrical elements 128a, 128b, and 128c may roll or rotate to limit friction on the structure.

Additionally, each of the arms 124a, 124b, and 124c may include multiple openings designed to receive objects. For example, the arm 124a (representative of the other arms) includes an opening 129a and an opening 129b designed to receive another object. This will be shown in further detail below.

Further, the apparatus 116 may include several triggers. For example, the apparatus 116 includes a trigger 130a, a trigger 130b, and a trigger 130c. In one or more implementations, each of the triggers 130a, 130b, and 130c includes a wire (e.g., metal wire). Further, in one or more implementations, each of the triggers 130a, 130b, and 130c takes the form of SMA. In this regard, each of the triggers 130a, 130b, and 130c may be pre-deformed, or shaped, in one state (e.g. cold state or unheated state), then subsequently deformed again to another shape, and then returned to its pre-deformed shape in another state (e.g., heated state). Additionally, each of the triggers 130a, 130b, and 130c may be electrically coupled to the sensor 117. Also, while FIG. 4 shows the triggers 130a, 130b, and 130c linked together to electrically couple to the sensor 117, each of the triggers 130a, 130b, and 130c may be uncoupled and/or individually electrically coupled to the sensor 117. In order to secure with the arms 124a, 124b, 124c, the triggers 130a, 130b, and 120c may pass through a respective opening of the arms 124a, 124b, 124c. For example, the trigger 130a passes through the opening 129b of the arm 124a.

FIG. 5 illustrates a perspective view of the arms 124a, 124b, and 124c of an apparatus 116, further showing the arms 124a, 124b, and 124c actuated by triggers 130a, 130b, and 130c, respectively, in accordance with aspects of the present disclosure. As shown, the sensor 117 detects an object 132 (e.g., pedestrian). When the object 132 is detected, the sensor 117 may output a signal in the form of electrical current (represented by an arrow 134). The electrical current may pass through each of the triggers 130a, 130b, and 130c. When each of the triggers 130a, 130b, and 130c takes the form of SMA, the triggers 130a, 130b, and 130c may provide electrical resistance to the electrical current, thus converting the electrical energy (from the electrical current) to thermal energy. As a result, each of the triggers 130a, 130b, and 130c may be heated. In this regard, when the triggers 130a, 130b, and 130c are heated to a threshold temperature, the triggers 130a, 130b, and 130c may return to their respective pre-deformed shapes. Moreover, the return to the respective pre-deformed shapes by the trigger 130a, the trigger 130b, and the trigger 130c may cause displacement of the arm 124a, the arm 124b, and the arm 124c, respectively. For example, each of the arms 124a, 124b, and 124c may move (e.g., rotating relative to the base 126) in a direction toward a longitudinal axis 136 that passes, or approximately, passes through a central region of the apparatus 116. Based on the displacement of the arms 124a, 124b, and 124c, a structure, such as a biasing component (not shown in FIG. 5) may be released, thus causing the apparatus 116 to transition to the deployed configuration shown in FIG. 3B. When the object 132 is no longer detected, the sensor 117 may cease providing electrical current to the triggers 130a, 130b, and 130c, causing the triggers 130a, 130b, and 130c to return to their original or prior state (e.g., shown in FIG. 4). By returning to its original state, the triggers 130a, 130b, and 130c may cause the arms 124a, 124b, and 124c, respectively, to return from their respective positions shown in FIG. 5 to their respective positions shown in FIG. 4. In addition, other structures, such as a biasing component, may be retained, subsequent to being released, by the arms 124a, 124b, and 124c.

While each of the triggers 130a, 130b, and 130c shown in FIG. 4 and FIG. 5 are described as SMA, other triggering mechanisms (e.g., clips) may be substituted. Generally, any actuator or actuating device that can function as a trigger and then subsequently be returned back to its original state (i.e., shape or position) may be used as a trigger.

Figure 6:
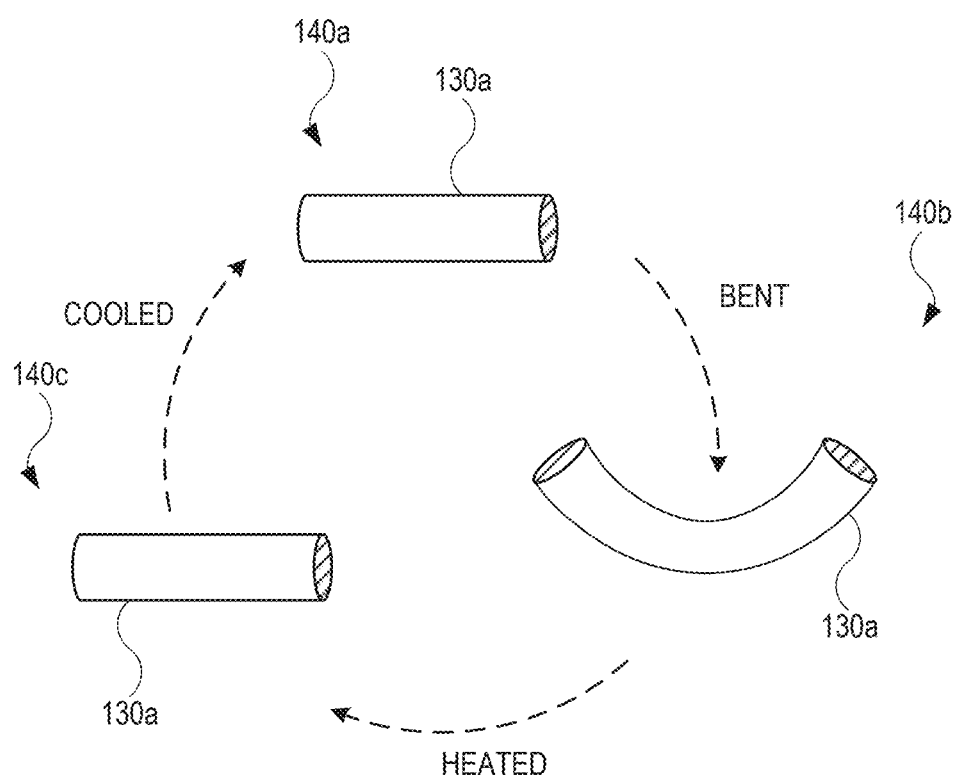
FIG. 6 illustrates an example of a trigger in multiple states, in accordance with aspects of the present disclosure.

FIG. 6 illustrates an example of a trigger 130a in multiple states, in accordance with aspects of the present disclosure. In a state 140a, the trigger 130a (representative of other triggers shown and/or described herein) may be in its original shape and unheated. In one or more implementations, the trigger 130a in the state 140a corresponds to a desired shape that is used to displace an arm (e.g. arm 124a shown in FIG. 5).

Subsequently, in a state 140b, the trigger 130a is pre-deformed to a desired shape while remaining unheated. In one or more implementations, the trigger 130a in the state 140b is coupled to an arm.

Then, in a state 140c, heat is applied. When a threshold temperature is reached, the trigger 130a is bent back to revert to its original shape. In one or more implementations, the threshold temperate is 30 degrees Celsius. However, the threshold temperate may be selected from a temperature value approximately in the range of 30 to 100 degrees Celsius.

Once cooled, the trigger 130a returns to the state 140a. The shapes of the trigger 130a shown and/or described for the states 140a, 140b, and 140c are exemplary and several other shapes may be implemented. When used with an apparatus described herein, the trigger 130a may be deformed or bent while unheated such that when the trigger 130a is heated to a threshold temperature, the trigger 130a bends, or is otherwise deformed, to displace arm (e.g., arm 124a shown in FIG. 5). As indicated herein, other actuators or actuating devices may function to return to their original or prior state when a stimulus (e.g., electrical current, thermal energy, another actuating arm) is no longer acting on the actuator or actuating device.

Figure 7A:
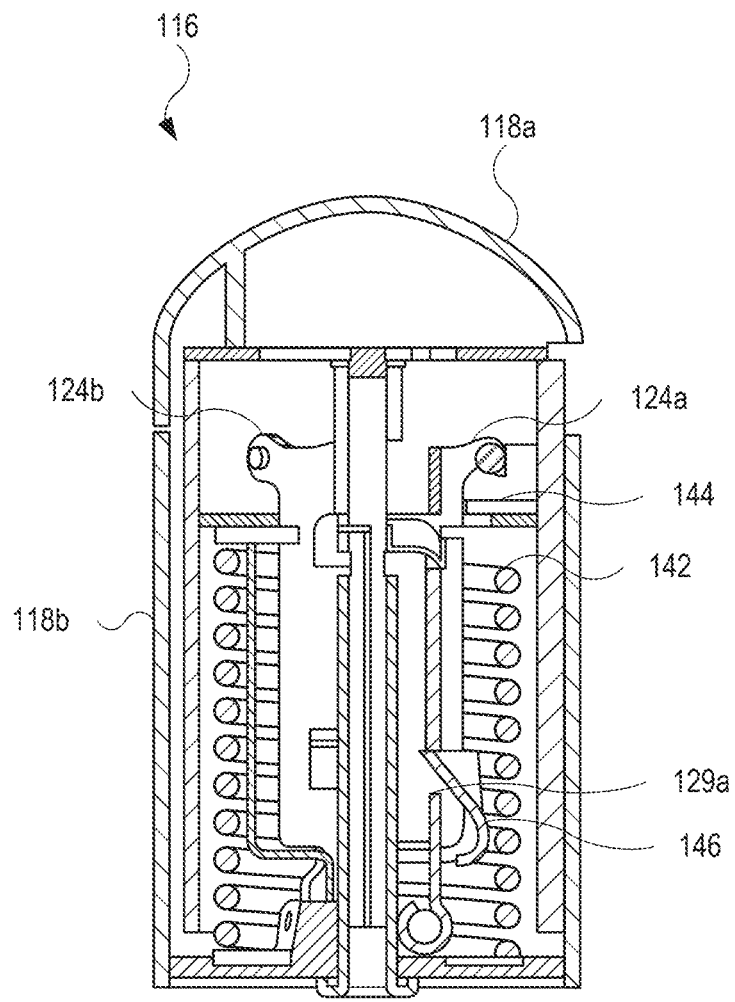
FIG. 7A illustrates a partial cross sectional view of an apparatus, showing the apparatus in a stowed position, in accordance with aspects of the present disclosure.

FIG. 7A illustrates a partial cross sectional view of the apparatus 116, showing the apparatus 116 in a stowed position, in accordance with aspects of the present disclosure. As shown, several components of the apparatus 116 are contained within the housings 118a and 118b. For example, the apparatus 116 includes a biasing component 142 that surrounds the arms 124a and 124b. Although not shown, the biasing component 142 further surrounds the arm 124c. In one or more implementations, the biasing component 142 takes the form of a spring. When the apparatus 116 is in the stowed position, the arms 124a, 124b, and 124c maintain the biasing component 142 is in a compressed state.

The apparatus 116 may further include a motion stop 144. In one or more implementations, the motion stop 144 limits travel of the biasing component 142. This will be shown below. The motion stop 144 may include a nook 146 (representative of additional nooks of the motion stop 144). As shown in FIG. 7A, the nook 146 is positioned in the opening 129a of the arm 124a.

Figure 7B:
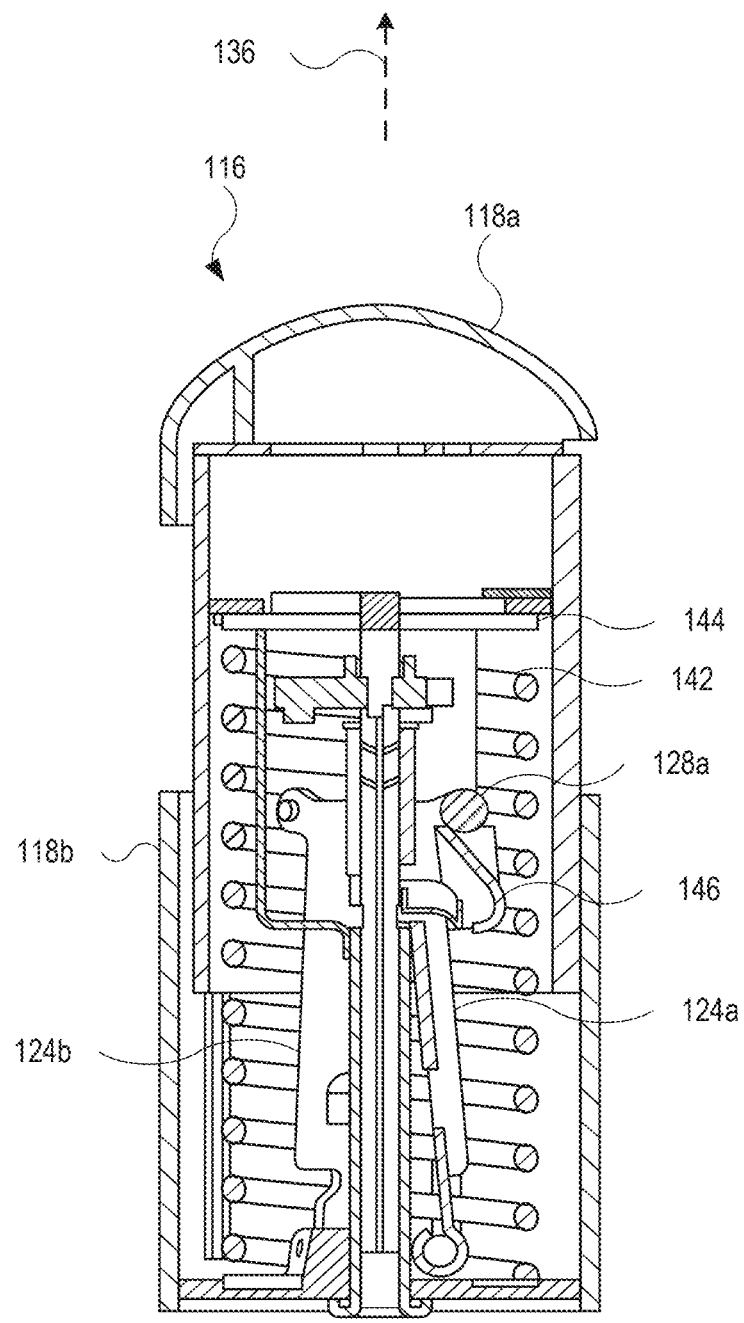
FIG. 7B illustrates a partial cross sectional view of an apparatus, showing the apparatus in a deployed position, in accordance with aspects of the present disclosure.

FIG. 7B illustrates a partial cross sectional view of the apparatus 116, showing the apparatus 116 in a deployed position, in accordance with aspects of the present disclosure. In order to transition the apparatus 116 to the deployed position, the arms 124a and 124b (as well as the arm 124c shown in FIG. 5) are displaced (e.g., rotated) toward the longitudinal axis 136. As a result, the arms 124a, 124b, and 124c release the biasing component 142 from the compressed state to a decompressed state. The released energy from the biasing component 142 actuates the housing 118a away from the housing 118b. Further, the motion stop 144 may limit travel of the biasing component 142. In this regard, the motion stop 144 may move with the biasing component 142 until the nook 146 of the motion stop 144 engages the cylindrical element 128a of the arm 124a, thereby preventing both the motion stop 144 and the biasing component 142 from further movement. When implemented in a vehicle (not shown in FIG. 7B), the apparatus 116 in the deployed state may release a hood of a vehicle.

Figure 8:
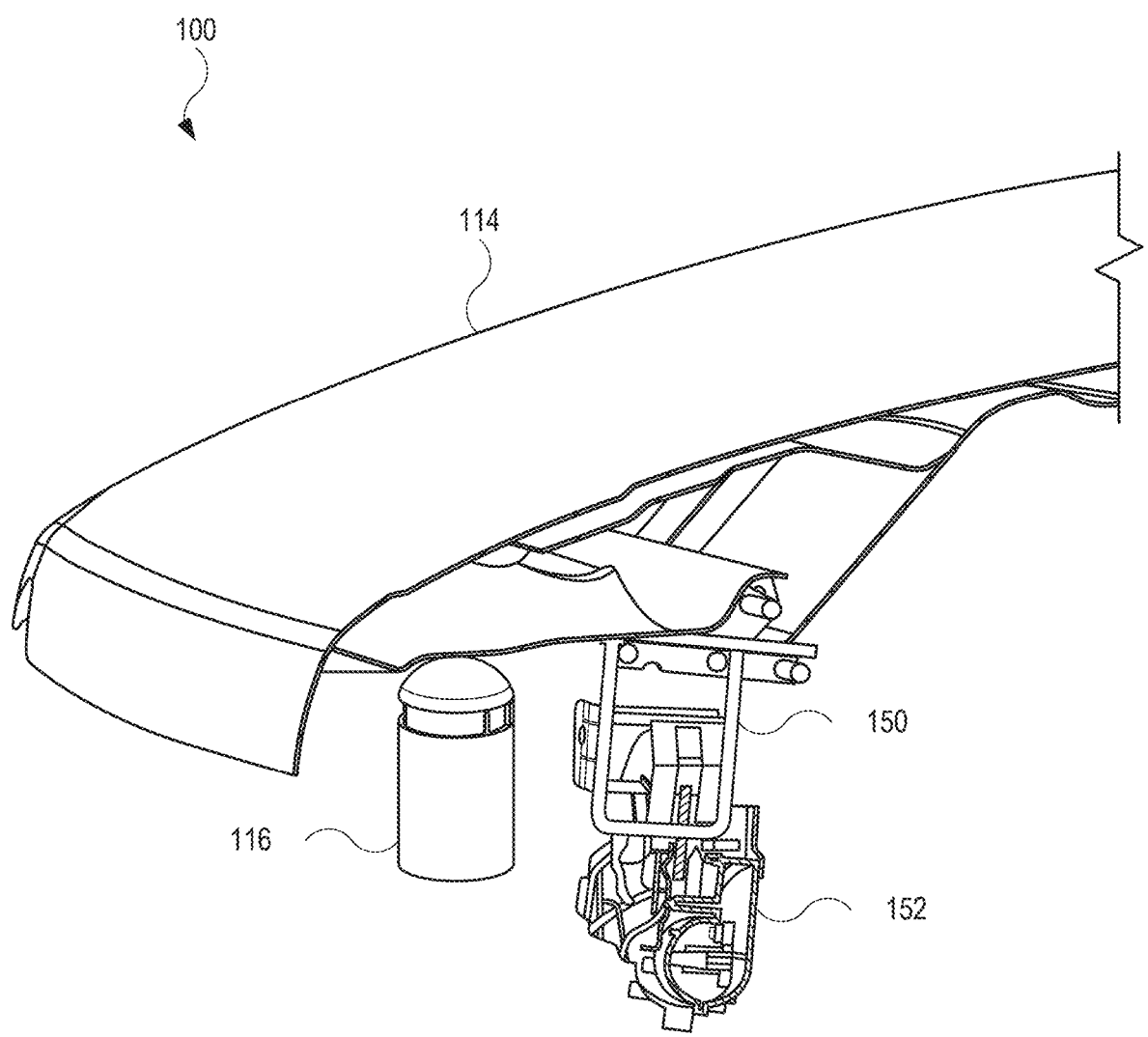
FIG. 8 illustrates a partial cross sectional view of a hood of a vehicle, further showing the apparatus positioned in the vehicle, in accordance with aspects of the present disclosure.

FIG. 8 illustrates a partial cross sectional view of the hood 114 of the vehicle 100, further showing the apparatus 116 positioned in the vehicle 100, in accordance with aspects of the present disclosure. As shown, the hood 114 is in a closed position. The vehicle 100 may include a striker 150 coupled (e.g., attached) with the hood 114. The vehicle 100 may further include a latch mechanism 152 designed to hold the striker 150 and maintain the hood 114 in the closed position.

Figure 9:
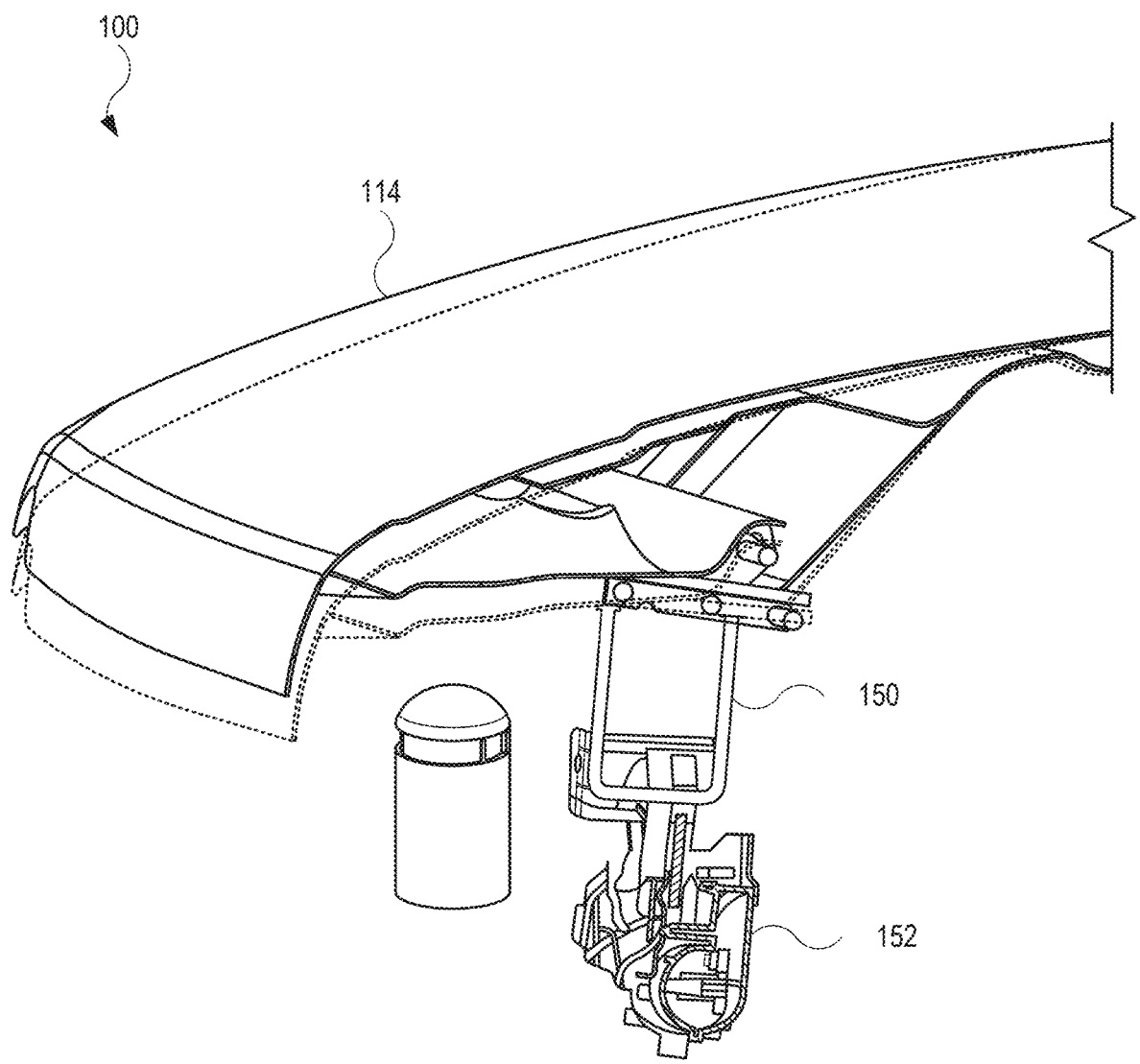
FIG. 9 illustrates a partial cross sectional view of a hood of a vehicle, showing the hood displaced, in accordance with aspects of the present disclosure.

FIG. 9 illustrates a partial cross sectional view of the hood 114 of a vehicle 100, showing the hood 114 displaced, in accordance with aspects of the present disclosure. In one or more implementations, the latch mechanism 152 may release, or least partially release, the striker 150, thus releasing, or at least partially releasing, the hood 114. The dotted lines represent the hood 114 in the (previously shown) closed position. As non-limiting examples, the latch mechanism 152 may be actuated manually by a user, or automatically by an input or gesture to a touch display (not shown in FIG. 9). The touch display may be part of a mobile wireless communication device (e.g., smartphone) or may be integrated with the vehicle 100. By releasing the striker 150, the hood 114 may be subsequently transitioned from the closed position to an open (e.g., fully open) position. Based on the open position of the hood 114, user may be able to further open the hood 114 and gain access to a space (e.g., frunk) of the vehicle 100.

Figure 10:
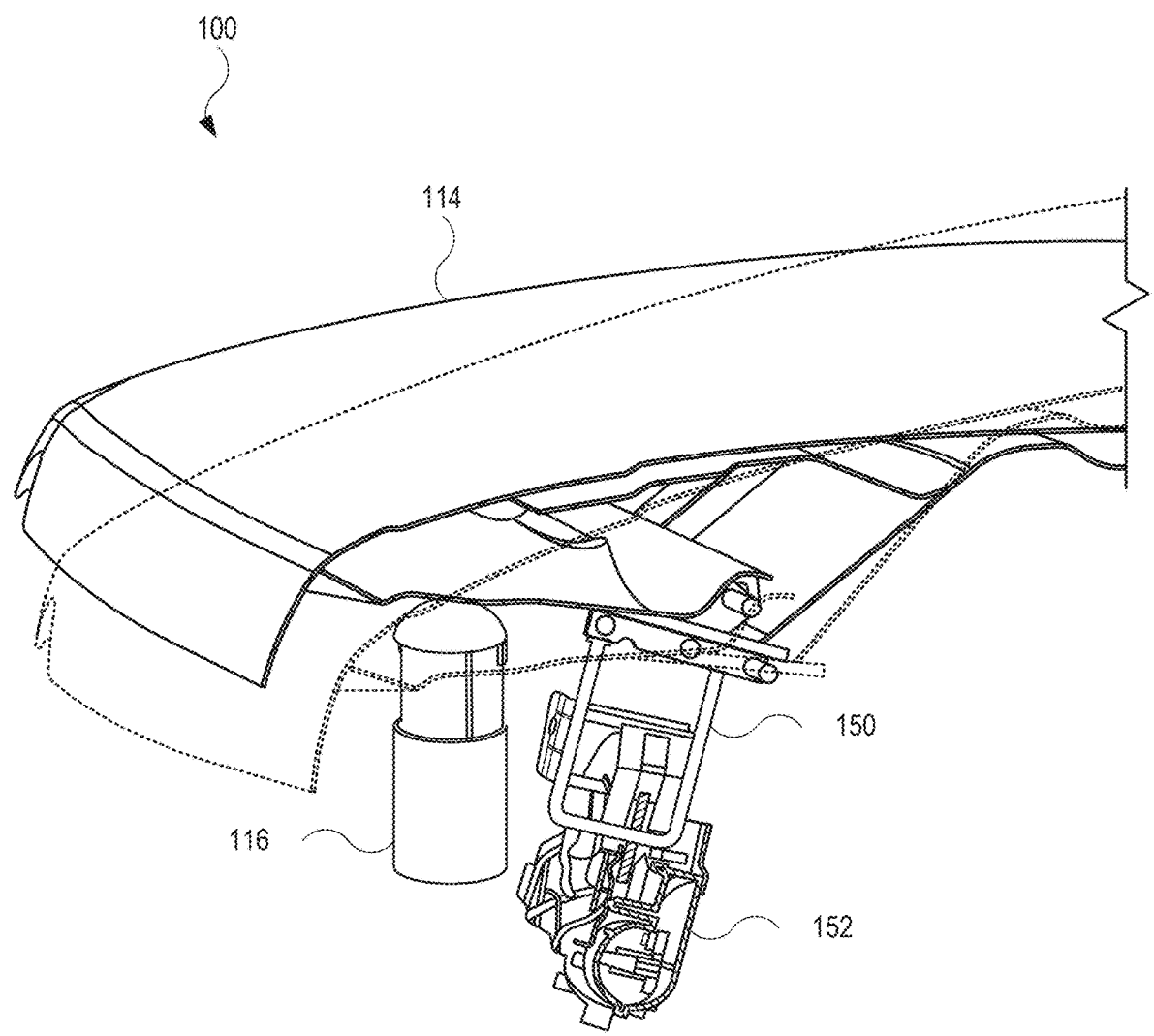
FIG. 10 illustrates a partial cross sectional view of a hood of a vehicle, showing the hood displaced by an apparatus, in accordance with aspects of the present disclosure.

FIG. 10 illustrates a partial cross sectional view of the hood 114 of a vehicle 100, showing the hood 114 displaced by the apparatus 116, in accordance with aspects of the present disclosure. As shown, the apparatus 116 is in the deployed position. In this regard, the apparatus 116 may be actuated by, for example, an input (e.g., electrical signal) provided by a sensor (e.g., sensor 117 shown in FIG. 5). When actuated, the apparatus 116 may engage the hood 114 and cause the hood 114 to displace (e.g., open, or at least partially open). Additionally, the displacement of the hood 114 may cause displacement of both the striker 150 and the latch mechanism 152. Further, in one or more implementations, the open position of the hood 114 in FIG. 10 may be greater (e.g., opened to greater degree or angle) as compared to the open position of the hood 114 shown in FIG. 9.

In one or more implementations, the apparatus 116 may open the hood 114 in response to a sensor detecting a pedestrian. Moreover, the apparatus 116 may open the hood 114 prior to the pedestrian making contact with the hood 114. The hood 114 may be better positioned to absorb the impact of the pedestrian as compared to the hood 114 absorbing the impact in the closed position. Beneficially, the hood 114 being opened by the apparatus 116 may reduce or prevent injury to the pedestrian.

Also, in one or more implementations, the hood 114 moves independently of the striker 150 and/or the latch mechanism 152. As a non-limiting example, when a user intends to open/release the hood 114 from the vehicle 100, the hood 114 may move without movement/actuation of the striker 150 and/or the latch mechanism 152. Alternatively, when the apparatus 116 is activated to move the hood 114, the striker 150 may be attached to the hood 114 via breakaway pins that separate the striker 150 from the hood 114 upon activation of the apparatus 116.

Figure 11:
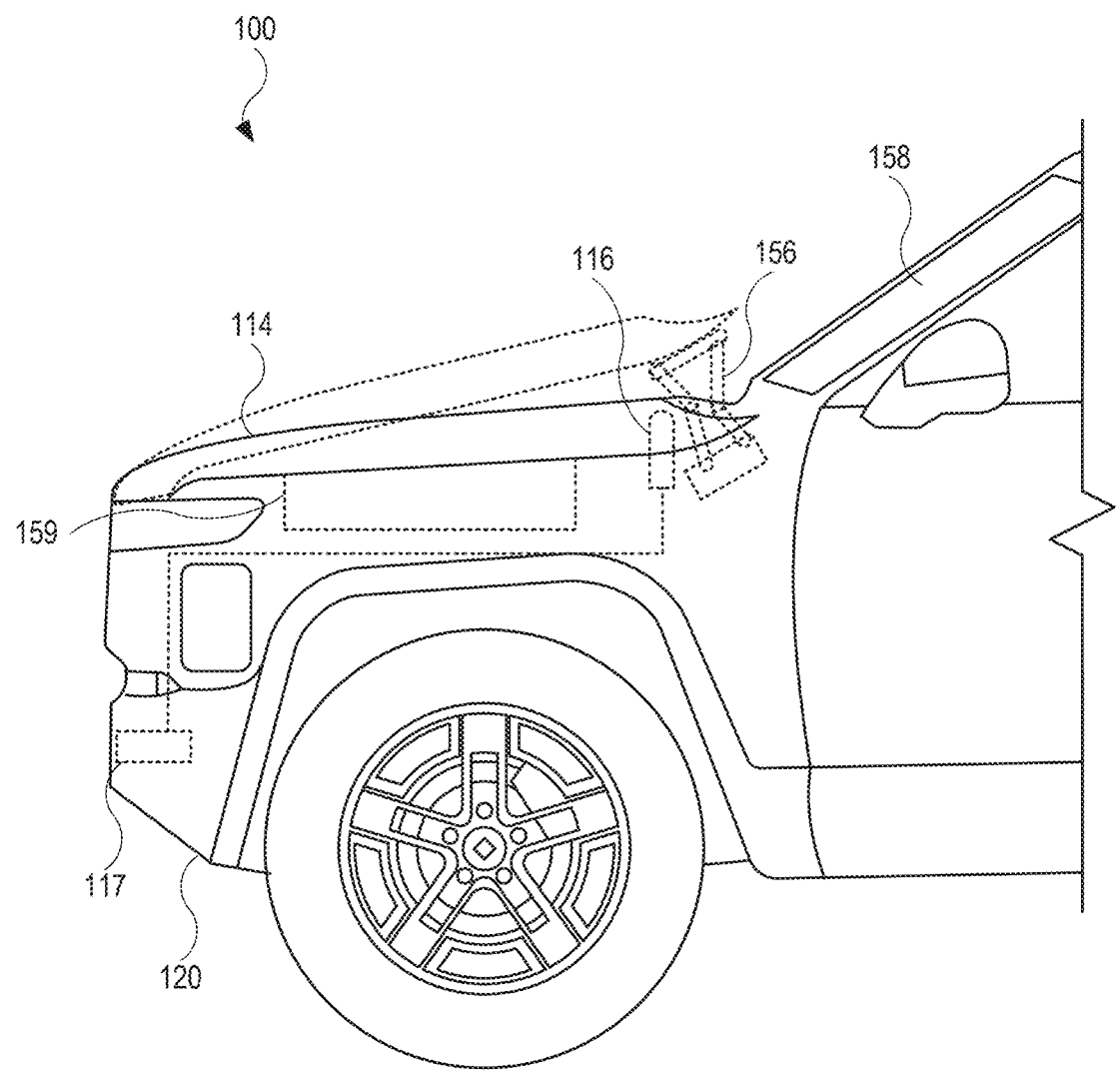
FIG. 11 illustrates an enlarged side view of a vehicle, showing an apparatus located in an alternate location of the vehicle, in accordance with aspects of the present disclosure.

FIG. 11 illustrates an enlarged side view of the vehicle 100, showing the apparatus 116 located in an alternate location of the vehicle 100, in accordance with aspects of the present disclosure. Similar to prior examples, the apparatus 116 may be used to release the hood 114. However, as shown in FIG. 11, the apparatus 116 is located at or near a rear portion of the hood 114. Based in part on the hinge 156, the hood 114 may transition from a closed position to an open position (shown a dotted lines).

As an exemplary application, when an object comes into contact with the bumper 120, the momentum of the object may cause the object to contact the hood 114. Moreover, in some instances, when the object is moving toward the vehicle 100, the additional momentum of the object may cause the object to contact a windshield 158 of the vehicle 100. However, based on the location of the apparatus 116, when the sensor 117 detects the object, the sensor 117 may generate and transmit a signal to the apparatus 116, which causes actuation of one or more components (not shown in FIG. 11) of the apparatus 116 to open the hood 114. In particular, the apparatus 116 may provide a force that causes the hinge 156 to open the hood 114. Similar to a prior example, the apparatus 116 is designed to react to the signal from the sensor 117 by causing the hood 114 to open prior to the object making contact with the hood 114. Moreover, the hood 114, in an open position, may block the object from contacting the windshield 158 or another object(s) such as a windshield motor (not shown in FIG. 11). When the object is a pedestrian, the hood 114 in the open position may reduce or prevent injury as compared to a pedestrian contacting the windshield 158. It should be noted that the hood 114 may also be opened to allow a user to further manually open the hood 114 and gain access to a space 159 (e.g., frunk) of the vehicle 100.

Figure 12A:
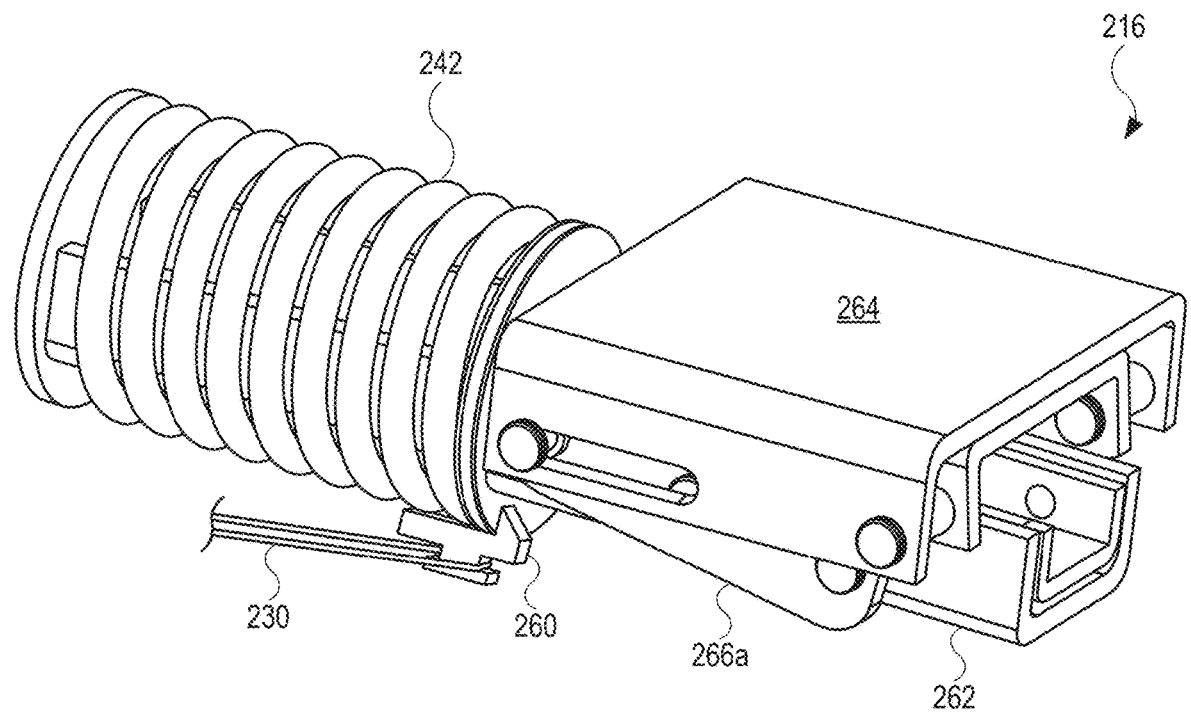
FIG. 12A and FIG. 12B illustrate perspective views of an alternate example of an apparatus, in accordance with aspects of the present disclosure.
Figure 12B:
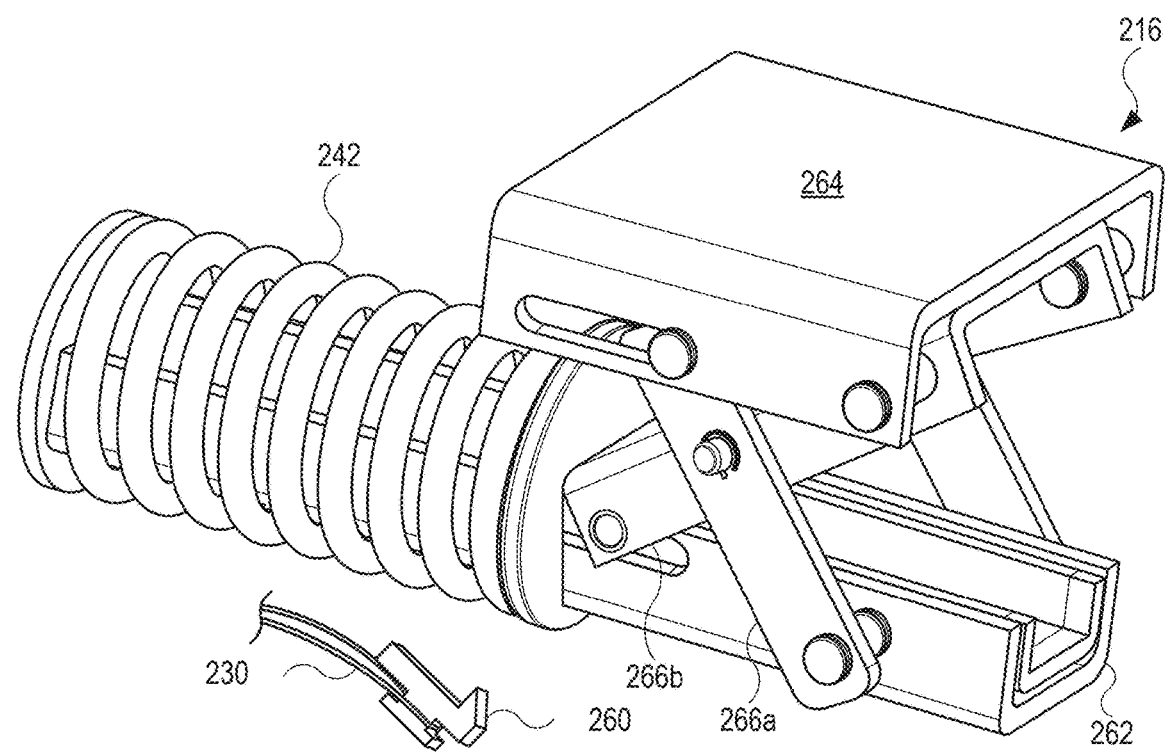

FIG. 12A and FIG. 12B illustrate perspective views of an alternate example of an apparatus 216, in accordance with aspects of the present disclosure. The apparatus 216 shown and described in FIG. 12A and FIG. 12B may substitute for prior examples of an apparatus (e.g., apparatus 116 shown in FIG. 2 and FIG. 11). Thus, the apparatus 216 may be located in a front portion or a rear portion of a vehicle.

Referring to FIG. 12A, the apparatus 216 may include a biasing component 242 (e.g., spring). As shown, the biasing component 242 is in a compressed state. In this regard, the apparatus 216 may include a hook 260 and a trigger 230 coupled to the hook 260 designed to hold the biasing component 242 in the compressed state. In one or more implementations, the trigger 230 takes the form of SMA.

The apparatus 216 may further include a bar 262 that passes through and holds the biasing component 242. The apparatus 216 may further include a platform 264 coupled to the bar 262 by several arms. For example, an arm 266a (representative of additional arms) is coupled to the bar 262 and the platform 264. Further, based on the position of the platform 264 and the biasing component 242, the apparatus 216 is in a stowed position.

Referring to FIG. 12B, the hook 260 releases the biasing component 242, causing the biasing component 242 to transition to a decompressed state. As a result, the biasing component 242 causes displacement of the arm 266a and an arm 266b (each of which is representative of an additional arm). The displacement of each of the arms 266a and 266b causes displacement of the platform 264. Based on the position of the platform 264 and the biasing component 242, the apparatus 216 is in a deployed position. When implemented in a vehicle (not shown in FIG. 12B), the apparatus 216 may release a hood of the vehicle based on contact between the platform 264 and the hood.

Figure 13:
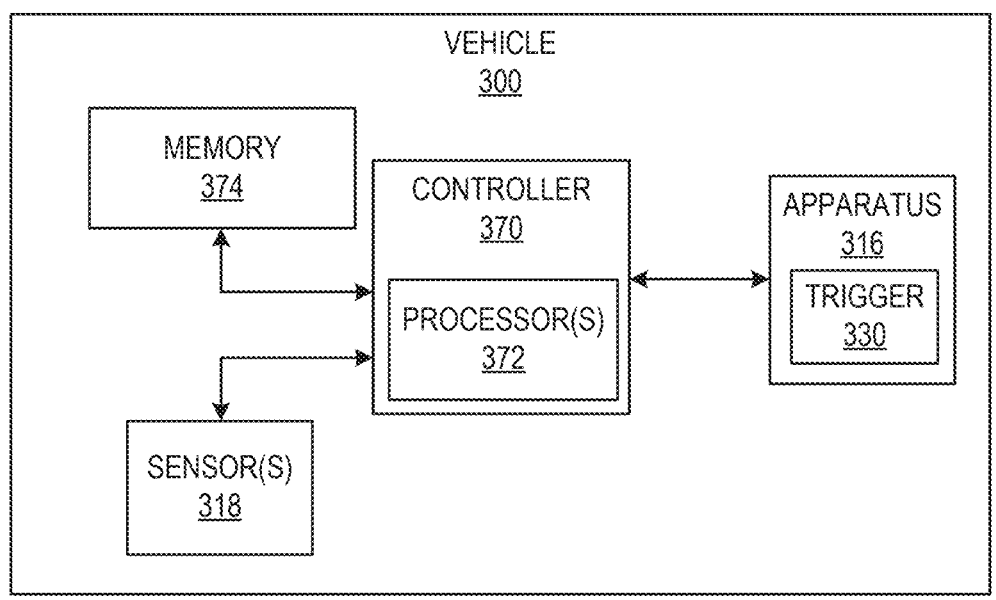
FIG. 13 illustrates a block diagram of a vehicle, in accordance with aspects of the present disclosure.

FIG. 13 illustrates a block diagram of a vehicle 300, in accordance with aspects of the present disclosure. The vehicle 300 may include a controller 370. In one or more implementations, the controller 370 includes one or more processors 372. The one or more processors 372 may include processing circuitry, such as a central processing unit (CPU), a graphics processing unit (GPU), one or more microcontrollers, an application specific integrated circuit (ASIC), or a combination thereof, as non-limiting examples. Additionally, the vehicle 300 may further include memory 374 that stores instructions and/or code, each of which being executable by the one or more processors 372. The memory 374 may include read-only memory (ROM) and/or random access memory (RAM).

The vehicle 300 may further include an apparatus 316. In one or more implementations, the apparatus 316 is capable of opening a hood of the vehicle 300. The vehicle 300 may further include one or more sensors 318. As non-limiting examples, the one or more sensors 318 may include a proximity sensor (e.g., capacitive sensor, photoelectric sensor, ultrasonic sensor), an image sensor (e.g., camera), or a combination thereof. In one or more implementations, the sensor 318 detects an object (e.g., pedestrian) and provides a signal. When the controller 370 receives the signal, the one or more processors 372 may generate an output to the apparatus 316 to, for example, transition from a stowed position to a deployed position. In this regard, the signal may include an electrical signal provided to a trigger 330 (e.g., SMA) of the apparatus 316, which causes the trigger 330 to deform, further causing the apparatus 316 to transition to the deployed position to release the hood of the vehicle 300.

Alternatively, in one or more implementations, the one or more sensors 318 are directly coupled and in direct communication with the apparatus 316. Put another way, the connection between one or more sensors 318 and the apparatus 316 may bypass the controller 370 and the one or more processors 372.

Figure 14:
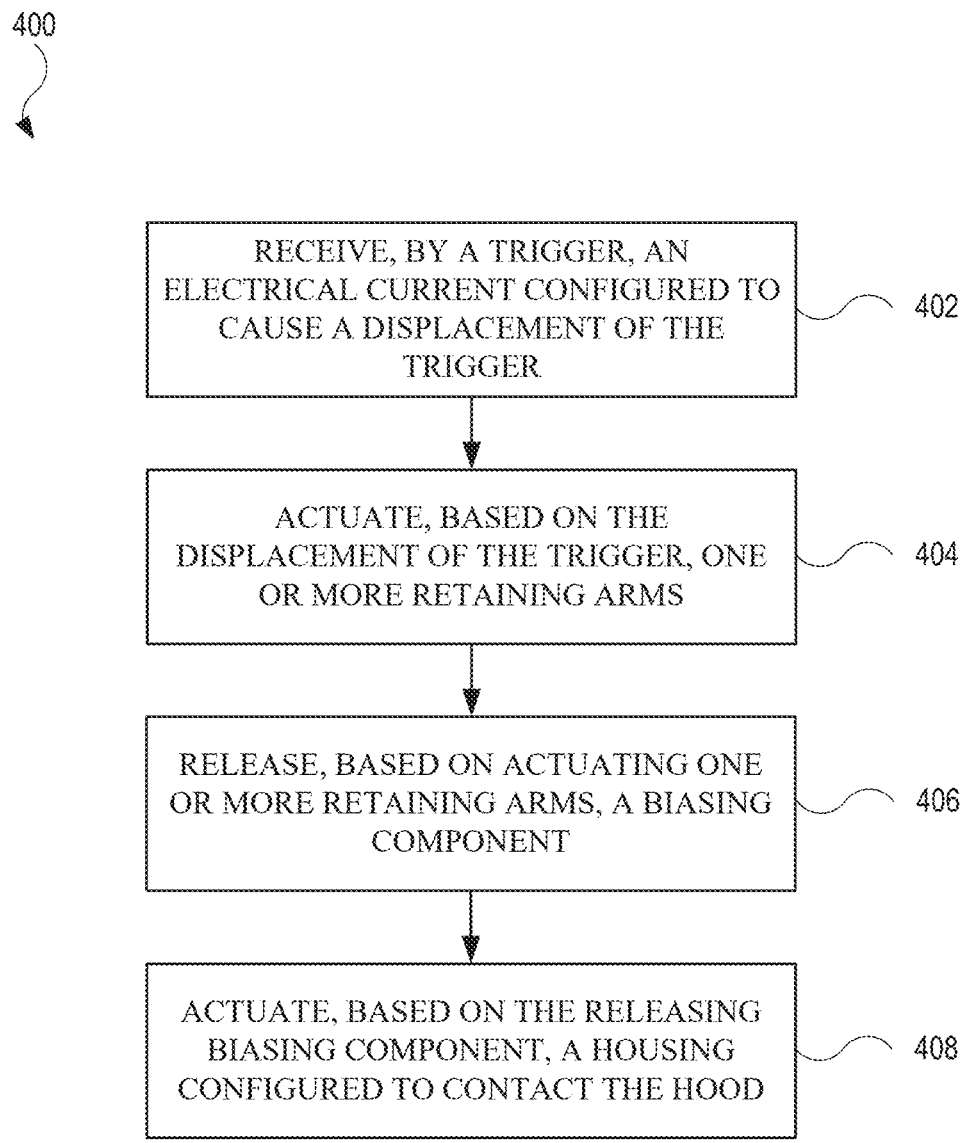
FIG. 14 illustrates a flow diagram showing an example of a process that may be carried out for actuating a hood of a vehicle, in accordance with implementations of the subject technology.

FIG. 14 illustrates a flow diagram showing an example of a process 400 that may be carried out for actuating a hood of a vehicle, in accordance with implementations of the subject technology. For explanatory purposes, the process 400 is primarily described herein with reference to an apparatus, such as the apparatus 116 shown in FIGS. 2-5 and 8-10, as a non-limiting example. However, the process 400 is not limited to the apparatus 116, and one or more blocks (or operations) of the process 400 may be performed by one or more other structural components of other suitable moveable apparatuses, devices, or systems. For example, the process 400 may be applicable to the apparatus 216 shown in FIG. 12A and FIG. 13B. Further for explanatory purposes, some of the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, a trigger receives an electrical current configured to cause a first displacement of the trigger. The electrical current may be provided from a sensor based in part on the sensor detecting a stimulus (e.g., object). In one or more implementations, the trigger takes the form of SMA designed to deform in shape based on applied heat.

At block 404, based on the displacement of the trigger, one or more retaining arms are actuated. At least one of the one or more retaining arms may be coupled with the trigger. In one or more implementations, the process 400 includes a trigger for each retaining arm of the one or more retaining arms.

At block 406, based on displacing one or more retaining arms, a biasing component is released. The one or more retaining arms may maintain the biasing component in a compressed state corresponding to a first position. When the one or more retaining arms are displaced, the biasing component may transition to a decompressed state corresponding to a second position. Also, the one or more retaining arms may return to their displaced state (e.g. prior position) and the biasing component may transition back to the compressed state.

At block 408, based on releasing the biasing component, a housing is actuated and is configured to contact the hood. The housing may be positioned over the biasing component and the one or retaining arms. In this regard, the housing is positioned to move based on the biasing component transitioning to the decompressed state.

In one or more implementations, the trigger is configured to deform, based on the sensor, to place the biasing component in a second position (corresponding to a decompressed state of the biasing component) and displace a hood of a vehicle. For example, the sensor may provide a signal in the form of electrical current to the trigger, thereby causing a temperature change to the trigger. When the temperature change achieves or exceeds a threshold temperature, the trigger deforms.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus for a vehicle, the comprising:
    a biasing component;
    a retaining arm configured to retain the biasing component in a first position; and
    a trigger, wherein:
        a displacement of the trigger causes a rotation of the retaining arm,
        the rotation of the retaining arm causes the biasing component to move from the first position to a second position to displace a hood of the vehicle,
        in the first position, the biasing component is in a compressed state, and
        in the second position, the biasing component is in a decompressed state.

2. The apparatus of claim 1, wherein:
    the biasing component comprises a spring, and
    the trigger comprises shape memory alloy.

3. The apparatus of claim 2, wherein in response to the shape memory alloy receiving electrical current, the shape memory alloy deforms.

4. The apparatus of claim 3, wherein the shape memory alloy is configured to receive the electrical current from a sensor in the vehicle, and in response to the sensor ceasing providing the electrical current, the biasing component is configured to return to the compressed state.

5. The apparatus of claim 1, wherein the trigger is configured to return to a prior state subsequent to the displacement of the trigger.

6. The apparatus of claim 1, where the decompressed state causes displacement of the hood.

7. The apparatus of claim 1, wherein the biasing component surrounds the retaining arm.

8. The apparatus of claim 1, further comprising:
a housing configured to receive the biasing component; and
a motion stop positioned in the housing, wherein the displacement of the biasing component is based on the motion stop.

9. A vehicle, comprising:
an apparatus, comprising:
a retaining arm comprising an opening, and
a spring configured to be compressed by the retaining arm to place the spring in a first state; and
a shape memory alloy passing through the opening; and
a sensor electrically coupled with the shape memory alloy, wherein:
in response to an output from the sensor to the shape memory alloy, the shape memory allow is configured to actuate the retaining arm, thereby causing the retaining arm to place the spring in a second state different from the first state, and
in the second state, the spring is configured to open a hood of the vehicle.

10. The vehicle of claim 9, further comprising:
a striker coupled with the hood; and
a latch mechanism configured to hold the striker, wherein the hood is configured to move relative to the latch mechanism.

11. The vehicle of claim 10, wherein the hood is configured to move relative to the striker.

12. The vehicle of claim 9, wherein:
the apparatus comprises a trigger coupled to the spring, the trigger configured to receive electrical current from the sensor based on an input from the sensor, and
the trigger comprises shape memory alloy configured to deform based on the electrical current.

13. The vehicle of claim 12, wherein the shape memory alloy is configured to actuate the one or more retaining arms based on the shape memory alloy deforming.

14. The vehicle of claim 9, further comprising: a housing configured to receive the spring; and
a motion stop positioned in the housing, wherein movement of the spring is based on the motion stop, and the one or more retaining arms comprise a cylindrical element configured to engage the motion stop.

15. The vehicle of claim 9, wherein the spring surrounds the one or more retaining arms.

16. The vehicle of claim 9, the sensor is carried by a bumper.

17. A method for actuating a hood of a vehicle, the method comprising:
receiving, by a trigger, an electrical current configured to cause a displacement of the trigger;
rotating, based on the displacement of the trigger, one or more retaining arms;
releasing, based on rotating of the one or more retaining arms, a biasing component; and
actuating, based on releasing the biasing component, a housing configured to contact the hood.

18. The method of claim 17, further comprising deforming, based on the electrical current, the trigger.

19. The method of claim 18, wherein deforming trigger comprises:
causing, based on a signal from a sensor, a temperature change in a wire; and
deforming, based on the temperature change, the wire.

20. The method of claim 17, wherein actuating the one or more retaining arms causes the one or retaining arms to move toward a longitudinal axis.

* * * * *